Aug. 14, 1945.           I. McLAREN                 2,382,949
                    BUBBLE FORMING DEVICE
                     Filed Feb. 28, 1942
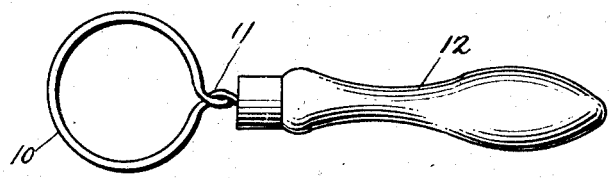
                                              INVENTOR
                                            Ian McLaren
                                         BY Frank Pooke
                                            HIS ATTORNEY Patented Aug. 14, 1945

2,382,949

UNITED STATES PATENT OFFICE 2,382,949

BUBBLE FORMING DEVICE

Ian McLaren, New York, N. Y.

Application February 28, 1942, Serial No. 432,737

3 Claims. (Cl. 46—6)

My present invention relates to an improved bubble forming device, and more particularly to an improved bubble forming device from which a succession of bubbles may be ejected by the mere act of waving the device through the air.

In practising my invention I may utilize preferably a closed loop of material, the loop being circular, oval, multi-sided, or any other form, and the loop may be made of a single strand or filament of any material, or a tube of any desired shape and of any desired length.

The object of my invention therefore, is an improved bubble forming device.

In the accompanying drawing the figure is a front view of my invention.

Referring to the drawing, 10 designates a loop, substantially circular in form, and formed of a single strand or filament of any suitable material, such as metal. The strand or filament is bent to shape, the ends twisted together as indicated by the reference numeral 11, and such twisted ends inserted in the end of a handle 12. The loop 10 is closed and may be circular, oval, or of any other desired form.

In operating my improved invention, the operator holds the device by the handle 12 and dips the loop 10 into a soap solution, or other solution from which the bubbles are to be made. The mere dipping of the device into the solution will allow sufficient solution to be retained by the loop to make a number of bubbles. The operator, by merely waving the device through the air, will cause a succession of bubbles to be ejected from the device, before the device requires reloading.

While I have necessarily described specific forms of my invention somewhat in detail, it is to be understood that I may vary the size, shape, and arrangement of parts comprising the device within relatively wide limits without departing from the spirit of the invention.

I claim:

1. An improved bubble forming device comprising a solid handle and a closed loop of filamentary material at one end thereof.

2. An improved bubble forming device comprising a solid handle and a closed loop of filamentary material of any form at one end thereof.

3. A bubble forming device comprising a closed loop of filamentary material and a handle attached thereto and in the plane of the loop.

IAN McLAREN.